(12) United States Patent
Havlin, Jr. et al.

(10) Patent No.: US 9,095,878 B2
(45) Date of Patent: Aug. 4, 2015

(54) COATING COMPOSITIONS AND METHODS OF APPLYING THE SAME

(75) Inventors: Dennis Lee Havlin, Jr., Walled Lake, MI (US); Mark Edward Nichols, Saline, MI (US)

(73) Assignee: Ford Motor Company, Dearborn, MI (US)

( * ) Notice: Subject to any disclaimer, the term of this patent is extended or adjusted under 35 U.S.C. 154(b) by 1050 days.

(21) Appl. No.: 11/828,773

(22) Filed: Jul. 26, 2007

(65) Prior Publication Data

US 2008/0032057 A1 Feb. 7, 2008

Related U.S. Application Data

(60) Provisional application No. 60/821,174, filed on Aug. 2, 2006.

(51) Int. Cl.
*B05D 7/16* (2006.01)
*B05D 1/36* (2006.01)
*B05D 7/00* (2006.01)
*C08G 18/18* (2006.01)
*C09D 175/04* (2006.01)

(52) U.S. Cl.
CPC .. *B05D 1/36* (2013.01); *B05D 7/52* (2013.01); *C08G 18/18* (2013.01); *C09D 175/04* (2013.01)

(58) Field of Classification Search
CPC .......... B05D 7/53; B05D 7/532; B05D 7/542; B05D 7/544
USPC .............................. 427/417, 333; 106/287.35
See application file for complete search history.

(56) References Cited

U.S. PATENT DOCUMENTS

| | | | |
|---|---|---|---|
| 4,759,961 A * | 7/1988 | Kato et al. ................. | 427/407.1 |
| 5,147,453 A | 9/1992 | Panush et al. | |
| 5,578,345 A * | 11/1996 | Moy ............................. | 427/333 |
| 5,609,960 A * | 3/1997 | Kasari et al. ................. | 428/413 |
| 5,994,469 A | 11/1999 | December et al. | |
| 6,184,273 B1 | 2/2001 | December et al. | |
| 6,342,144 B1 | 1/2002 | December | |
| 6,387,519 B1 | 5/2002 | Anderson et al. | |
| 6,541,594 B2 | 4/2003 | Ohrbom et al. | |
| 6,555,231 B2 | 4/2003 | Doty et al. | |
| 6,559,265 B2 | 5/2003 | Lamers et al. | |
| 6,592,998 B2 | 7/2003 | Anderson et al. | |
| 6,592,999 B1 | 7/2003 | Anderson et al. | |
| 6,593,417 B1 | 7/2003 | Anderson et al. | |
| 6,623,791 B2 | 9/2003 | Sadvary et al. | |
| 6,624,276 B2 | 9/2003 | Lamers et al. | |
| 6,635,341 B1 | 10/2003 | Barancyk et al. | |
| 6,652,919 B1 | 11/2003 | Campbell et al. | |
| 6,657,001 B1 | 12/2003 | Anderson et al. | |
| 6,740,359 B2 | 5/2004 | Kumar et al. | |
| 6,759,478 B2 | 7/2004 | Anderson et al. | |
| 6,803,408 B2 | 10/2004 | Anderson et al. | |
| 6,872,765 B1 | 3/2005 | Betz et al. | |
| 6,962,730 B2 | 11/2005 | Ohrbom et al. | |
| 6,989,421 B2 | 1/2006 | Grady | |
| 7,001,958 B2 | 2/2006 | Pelosi et al. | |
| 7,005,472 B2 | 2/2006 | Anderson et al. | |
| 7,053,149 B2 | 5/2006 | Anderson et al. | |
| 7,067,584 B2 | 6/2006 | Rink et al. | |
| 7,071,242 B2 | 7/2006 | Flosbach et al. | |
| 7,071,286 B2 | 7/2006 | Barsotti et al. | |
| 7,091,278 B2 | 8/2006 | Huybrechts | |
| 7,166,748 B2 | 1/2007 | Lenges et al. | |
| 7,214,828 B2 | 5/2007 | Lenges et al. | |
| 2002/0107325 A1 * | 8/2002 | Gilbert et al. ................. | 525/125 |
| 2003/0012959 A1 | 1/2003 | Doty et al. | |
| 2003/0039840 A1 * | 2/2003 | Beck et al. ................. | 428/423.1 |
| 2003/0069381 A1 * | 4/2003 | Huynh-Ba ..................... | 528/49 |
| 2003/0207985 A1 | 11/2003 | Anderson et al. | |
| 2003/0212199 A1 | 11/2003 | Anderson et al. | |

(Continued)

FOREIGN PATENT DOCUMENTS

| | | |
|---|---|---|
| EP | 0 119 051 B1 | 7/1988 |
| EP | 0 709 415 B1 | 7/2001 |

(Continued)

OTHER PUBLICATIONS

Coating (definition), http://www.collinsdictionary.com/dictionary/english/coating?showCookiePolicy=true, retrieved online on Apr. 12, 2014, p. 1.*

(Continued)

*Primary Examiner* — Michael Cleveland
*Assistant Examiner* — Francisco Tschen
(74) *Attorney, Agent, or Firm* — Damian Porcari; Brooks Kushman P.C.

(57) ABSTRACT

One aspect of the present invention is a coating system for use in a wet on wet coating application process. The coating system includes a first coating composition, a second coating composition, and a boundary layer. The first coating composition includes a first bulk polymer resin and a first reactive component selected from the group consisting of a part A and a part B reactive component. The second coating composition includes a second bulk polymer resin and a second reactive component comprised of the other reactive component of the part A and the part B reactive component group. The boundary is formed upon applying a first layer of the first coating composition to a second layer of the second coating composition. The boundary layer includes the reaction product of the part A and the part B reactive component and is situated between the first layer and the second layer.

19 Claims, No Drawings

(56) References Cited

U.S. PATENT DOCUMENTS

| | | | |
|---|---|---|---|
| 2004/0044165 A1 | 3/2004 | Barancyk et al. | |
| 2004/0176529 A1 | 9/2004 | Anderson et al. | |
| 2004/0192817 A1* | 9/2004 | Staunton et al. | 524/284 |
| 2004/0225057 A1 | 11/2004 | Anderson et al. | |
| 2006/0128901 A1 | 6/2006 | Ramesh et al. | |
| 2007/0202341 A1* | 8/2007 | Dogan et al. | 428/423.1 |

FOREIGN PATENT DOCUMENTS

| | | |
|---|---|---|
| EP | 1 227 113 A1 | 7/2002 |
| EP | 0 893 483 B1 | 4/2003 |
| EP | 1 331 044 B1 | 4/2005 |
| EP | 1 479 453 B1 | 10/2006 |
| GB | 2 399 521 A | 9/2004 |
| GB | 2 401 563 A | 11/2004 |
| WO | 01/36114 A1 | 5/2001 |
| WO | 2005/070873 A2 | 8/2005 |
| WO | 2005/070986 A1 | 8/2005 |
| WO | 2005/123862 A1 | 12/2005 |
| WO | WO 2005/123862 * | 12/2005 |

OTHER PUBLICATIONS

European Search Report, Dated Oct. 31, 2007, Ford Motor Company, Application No. 07113528.9-2115, Reference P7995.
Chinese Office Action dated May 25, 2011 for Serial No. 200710143816, pp. 1-3.
Mark Drukenbrod—"Industry Letter—Editorial Highlight" Editorial of Apr. 24, 2007, http://www.specialchem4coatings.com/news-trends/editorials/editorial.aspx?or=home&id=7061, 3 Pages.
Industry News, "DuPont Wins Prestigious Automotive Innovation Award", Apr. 19, 2007, http://www.specialchem4coatings.com/news-trends/displaynews.aspx?id=7037, 2 Pages.
Ralph Kisiel, "All-wet paint plan will cut factory's equipment, costs", rkisiel@crain.com, 1 Page.

* cited by examiner

COATING COMPOSITIONS AND METHODS OF APPLYING THE SAME

CROSS-REFERENCE TO RELATED APPLICATION

This application claims the benefit of U.S. Provisional Application Ser. No. 60/821,174, filed Aug. 2, 2006.

BACKGROUND

1. Technical Field

One aspect of the present invention relates to coating compositions and another aspect of the present invention relates to applying coating compositions to substrates.

2. Background Art

Many known paint application systems include the application and curing of multiple layers of coatings, which result in the original finish to the exterior surfaces of consumer products, including, but not limited to, automotive vehicles. As one example, wet on wet paint application systems involve the application of a subsequent coating to a substantially uncured previously applied coating. The two substantially uncured coatings are then jointly cured by a curing process, which may involve a curing oven.

One proposed wet on wet paint application system includes the sequential application of multiple coating compositions, including an electrocoat (ecoat), a primer coat, a basecoat and a clearcoat. The ecoat is applied to a substrate (for example, an automotive vehicle panel) and is subsequently cured. Furthermore, the wet on wet system includes applying the primer coat to the cured ecoat, curing the primer coat, subsequently applying the basecoat to the cured primer coat, and subsequently applying the clearcoat to the uncured basecoat. The adjacent uncured coating layers, i.e., the basecoat and clearcoat, are then jointly cured to obtain a cured paint system.

SUMMARY

According to one embodiment of the present invention, a coating system is disclosed. The coating system includes a first layer, a second layer and a boundary layer. The first layer is comprised of a first coating composition including a first bulk polymer resin and a first reactive component selected from the group consisting of a part A reactive component and a part B reactive component. The part A reactive component is reactive with the part B reactive component. The second layer is of a second coating composition including a second bulk polymer resin and a second reactive component comprised of the unselected reactive component from the group consisting of the part A reactive component and the part B reactive component. The boundary layer is formed upon applying the first layer of the first coating composition to the second layer of the second coating composition. The boundary layer includes the reaction product of the part A reactive component and the part B reactive component and is situated between the first layer and the second layer.

According to another embodiment of the present invention, a coating composition is disclosed for use in a wet on wet coating application process involving the application of a layer of the coating composition to an applied coating layer. The coating composition includes a bulk polymer resin and a reactive component selected from the group consisting of a part A reactive component and a part B reactive component. The part A reactive component is reactive with the part B reactive component. The applied coating layer includes the other unselected reactive component from the group consisting of the part A reactive component and the part B reactive component. Upon applying a layer of the coating composition to the applied coating layer, a boundary layer is formed. The boundary layer includes the reaction product of the part A reactive component and the part B reactive component.

In one embodiment of the present invention, a wet on wet coating application method is disclosed. The method includes providing a first coating composition, a second coating composition and a substrate. The first coating composition includes a first bulk polymer resin and a first reactive component selected from the group consisting of a part A reactive component and a part B reactive component. The part A reactive component is reactive with the part B reactive component. The second coating composition includes a second bulk polymer resin and a second reactive component including the other, unselected reactive component from the group consisting of the part A reactive component and the part B reactive component. The method further includes applying the first coating composition to the substrate to form a first coating layer and applying the second coating composition to the first coating layer to form a second coating layer and to form a boundary layer situated between the first and second coating layers and comprising the reaction product of the reactive component and the unselected reactive component.

In another embodiment of the present invention, a coating system is disclosed. The coating system includes a first coating composition comprising a first bulk polymer resin, a part A reactive component and a part B reactive component. The part A reactive component is reactive with the part B reactive component. The coating system also includes a second coating composition comprising a second bulk polymer resin and a catalyst capable of catalyzing the reaction of the part A reactive component and the part B reactive component. The coating system further includes a boundary layer formed upon interfacing a first layer of the first coating composition to a second layer of the second coating composition. The boundary layer includes the reaction product of the part A reactive component and the part B reactive component catalyzed by the catalyst and situated between the first layer and the second layer.

According to another embodiment of the present invention, a coating composition is disclosed for use in a wet on wet coating application process involving the application of a layer of the coating composition to a coating layer. The coating composition includes a bulk polymer resin, a part A reactive component, and a part B reactive component. The part A reactive component is reactive with the part B reactive component. A coating layer comprising a catalyst is capable of catalyzing the reaction of the part A reactive component and the part B reactive component. Upon interfacing a layer of the coating composition to the coating layer, a boundary layer is formed. The boundary layer includes the reaction product of the part A reactive component and the part B reactive component, catalyzed by the catalyst.

A wet on wet coating application method is disclosed according to one embodiment of the present invention. The method includes providing a first coating composition, a second coating composition and a substrate. The first coating composition includes a first bulk polymer resin, a part A reactive component, and a part B reactive component. The part A reactive component is reactive with the part B reactive component. The second coating composition includes a second bulk polymer resin and a catalyst capable of catalyzing the reaction of the part A reactive component and the part B reactive component. The method further includes applying one of the first or second coating compositions to the substrate to form a first coating layer. The method also includes applying the other, unapplied composition of the first and second coating compositions to form a second coating layer and to form a boundary layer situated between the first and second coating layers and comprising the reaction product of the part A reactive component and the part B reactive component, catalyzed by the catalyst.

DETAILED DESCRIPTION OF EMBODIMENTS OF THE PRESENT INVENTION

As required, detailed embodiments of the present invention are disclosed herein. However, it is to be understood that the disclosed embodiments are merely exemplary of the invention that may be embodied in various and alternative forms. Therefore, specific details disclosed herein are not to be interpreted as limiting, but merely as a representative basis for the claims and/or as a representative basis for teaching one skilled in the art to variously employ aspects of the present invention. Moreover, except for otherwise expressly indicated, all numeral quantities in this description indicating amounts of material are to be understood as modified the word "about" in describing the broadest scope of the invention. Practice within the numerical limit stated is generally preferred.

Unless expressly stated to the contrary: percent, "parts of," and ratio values are by weight; the term "polymer" includes "oligomer," "copolymer," "terpolymer," and the like; the description of a group or class of materials as suitable or preferred for a given purpose in connection with at least one aspect of the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; and the first definition of an acronym or other abbreviation applies to all subsequent uses herein of the same abbreviation and applies mutatis mutandis to normal grammatical variations of the initially defined abbreviation.

Wet on wet systems may provide one or more benefits over a traditional system where a curing step typically occurs, e.g., between the application of the primer coat and basecoat. Heat-based curing methods, such as radiant, direct fire or infrared heating, are typically energy and capital intensive because of equipment requirements, the relatively large areas of factory floor space that are used, and the relatively high utility consumption. Energy and/or cost savings can be obtained by eliminating the curing step between the application of the wet coating layers. Moreover, one or more baking ovens, which are commonly used for curing the coating compositions, can be eliminated through the use of a wet on wet system.

In order to provide a cured paint system with an acceptable appearance and material performance, it is important to maintain the integrity of each wet layer without intrusion, comingling, and/or mixing (otherwise referred to as strike-in) of the previous layer with the subsequent layer. Strike-in between the wet coating layers may result in undesirable phenomena, such as reduced appearance quality and/or compromised properties of the cured coating layers. In extreme cases, such compromises in the coating layer properties may result in premature failure of the paint system.

According to current methods, layer separation may be achieved by air drying between application of layers and/or alternating chemical compositions of adjacent layers to achieve chemical separation of the layers. The air drying time, otherwise referred to as flash time, may increase process cycle time and/or increase the process equipment and building footprint costs.

Accordingly, it is desirable, and there is a need, to provide a wet on wet paint application system and coating compositions for use in wet on wet paint application systems that minimize strike-in between wet coating layers such that the resulting paint system has acceptable properties. Moreover, there is a need to provide a wet on wet paint application system and coating compositions for use in wet on wet paint application systems that do not require flash time between application of wet on wet layers.

One or more embodiments of the present invention address the problem of unacceptable processing times of wet on wet systems resulting from the necessity of flash times in order to minimize strike-in. While current methods sacrifice processing time to enable mitigation of strike-in, one or more embodiments of the present invention deliver reduced strike-in and processing time, thereby addressing a combination of problems not recognized or addressed by current methods. In one or more embodiments, the reduction or elimination of processing time, i.e., flash time, may reduce power consumption and costs compared to conventional paint methods and systems.

The present invention includes embodiments directed at wet on wet paint application systems and coating compositions for use in wet on wet paint application systems. The paint application systems and the coating compositions can be used as the external and/or internal finishes for consumer products, such as exterior surfaces of automotive vehicles.

In one embodiment of the present invention, a coating system for use in a wet on wet coating application process is disclosed. The coating system includes a first coating composition, a second coating composition and a boundary layer. The first coating composition includes a first bulk polymer resin and a first reactive component selected from a part A reactive component and a part B reactive component group, which are reactive with each other. The second coating composition includes a second bulk polymer resin and a second reactive component being the other unselected member of the part A reactive component and the part B reactive component group. The boundary layer is formed upon applying a first layer of the first coating composition to a second layer of the second coating composition. The boundary layer includes the reaction product of the part A reactive component and the part B reactive component and is situated between the first layer and the second layer. In one embodiment, the first coating composition is a basecoat and the second coating composition is a primer coat. In another embodiment, the first coating composition is a clearcoat and the second coating composition is a basecoat. The part A reactive component can be an isocyanate and the part B reactive component can be a polyol.

According to another embodiment of the present invention, a coating system for use in a wet on wet coating application process is disclosed. The coating system includes a first coating composition, a second coating composition and a boundary layer. The first coating composition includes a first bulk polymer resin, a part A reactive component and a part B reactive component. The second coating composition includes a second bulk polymer resin and a catalyst capable of catalyzing the reaction between the part A reactive component and the part B reactive component. The boundary layer is formed upon applying a first layer of the first coating composition to a second layer of a second coating composition. The boundary layer includes the reaction product of the part A reactive component and the part B reactive component catalyzed by the catalyst and is situated between the first layer and the second layer. In at least one embodiment, the first coating composition is a basecoat and the second coating composition is a primer coat. In another embodiment, the first coating composition is a clearcoat and the second coating composition is a basecoat.

In at least one embodiment, a wet on wet paint application system is disclosed that includes the application and curing of an electrocoat (ecoat) to a substrate (for example, the external surface of a vehicle panel), followed by the application of a wet primer coat to the cured ecoat, followed by the application of a basecoat to the at least substantially uncured primer coat, followed by the application of a clearcoat (otherwise referred to as a topcoat) to the at least substantially uncured basecoat, followed by the simultaneous curing of the at least substantially uncured primer coat, basecoat and clearcoat. Non-limiting examples of other substrates that can be utilized in accordance with the present invention include sheet molding compound (SMC) substrates, GTX resin substrates, and other substrate materials that are suitable for the construction of automotive bodies.

The coating compositions of the present invention are typically applied at a sufficient thickness to produce a cured coating layer that is at least 0.5 mils thick and in some embodiments is less than 0.5 mils thick. When the curing composition is used as a primer coat, the thickness of the cured coating can be from 0.5 to 1.5 mils thick. When the curing composition is used as a basecoat, the thickness of the cured coating can be from 0.4 to 1.6 mils thick. When the coating composition is used as a clearcoat, the thickness of the cured coating can be from 1.0 to 2.5 mils thick.

The coating compositions can contain a substantial amount of a polymer resin, otherwise referred to as a bulk polymer resin. When the coating composition is a basecoat, the bulk polymer resin can be a pigmented resin, for example, the resin can be an acrylic, a polyurethane, or a polyester. Other polymer resins that are known in the art as basecoat compositions include, but are not limited to, vinyls, polycarbonates, alkyds, and polysiloxanes. Basecoat polymers can be crosslinkable, and thus include one or more type of crosslinkable functional groups. Such groups include, for example, hydroxy, isocyanate, amine, epoxy, acid, anhydride, acrylate, vinyl, silane, and acetoacetate groups. These groups may be masked or blocked in such a way so that they are unblocked and available for the cross-linking reaction under the desired curing conditions, generally elevated temperatures. In certain embodiments, crosslinkable functional groups include hydroxy functional groups and amino functional groups. When the coating composition is a clearcoat, the bulk polymer resin can include carbonate functionality. The bulk polymer resin can be cured by any known mechanism or curing agent. In certain embodiments, the curing process occurs in bulk at an elevated temperature. The coating can be cured at a temperature of at least about 80° C., in certain embodiments at least about 100° C., and in other embodiments at least about 120° C. The curing time may vary depending on the particular components used and physical parameters such as the thickness of the layers. Typical curing times range from 15 to 60 minutes.

The components of the coating composition can be uniformly mixed, along with other ingredients. The components, in addition to a bulk polymer resin, can include, but are not limited to organic solvents, antioxidants, UV absorbers, light stabilizers, pigments, fillers, catalysts, rheology control agents, and adhesion promoters.

In at least one embodiment, the coating compositions (otherwise referred to as the first and second coating compositions) of adjacent wet coating layers (otherwise referred to as the first and second wet coating layers) include a part A-part B reactive component system. The first coating composition can be a previous or subsequently applied layer in a sequential wet on wet application process, while the second coating composition can be the other of the applied layers. Upon application of the second coating layer, the part A-part B reactive component system reacts at the interface between the first and second wet coating layers to form a boundary layer to minimize migration and/or mixing, i.e., strike-in between the adjacent wet coating layers.

In at least one embodiment, the first coating composition contains a part A reactive component or the part B reactive component. In certain embodiments, the weight percent of the reactive component can be in the range of 10 to 70 weight percent. The first coating composition also contains a bulk polymer resin. In certain embodiments, the weight percent of the bulk polymer resin can be in the range of 30 to 90 weight percent.

The second coating composition contains the other reactive component. In certain embodiments, the weight percentage of the other reactive component can be in the range of 10 to 70 weight percent. The second coating composition also contains a bulk polymer resin. In certain embodiments, the weight percentage of the bulk polymer resin can be in the range of 30 to 90 weight percent.

According to one example, the first coating composition is a basecoat that contains a polyol as the part A reactive component at a 40 weight percent of the total weight of the first coating composition. In certain embodiments, the basecoat contains an acrylic compound with hydroxyl functionality mixed with a melamine resin. The second coating composition is a clearcoat that contains an isocyanate as the part B reactive component at a 30 weight percent of the total weight of the second coating composition. In certain embodiments, the clearcoat contains an acrylic compound with hydroxyl functionality mixed with a melamine resin.

In at least one embodiment, the first coating composition is a primer coat and the second coating composition is a basecoat.

According to another example, the first coating composition is a primer coat and the second coating composition is a basecoat. Moreover, a third coating composition, i.e., a clearcoat is contemplated by the present invention, where each of the first, second and third coating compositions are sequentially applied as wet coating layers. Each of the coating compositions includes a reactive component. For example, the primer coat can contain a part A reactive component, the basecoat can contain a part B reactive component, and the clearcoat can contain a part A reactive component. After application of the three wet layers, a first and second boundary layer is formed between adjacent wet layers, i.e., primer coat/basecoat and basecoat/clearcoat.

It should be appreciated that any weight percentages of the part A and part B reactive components can be utilized provided that the weight percentages do not substantially affect the cure kinetics of the bulk polymer resins of the first and second coating compositions. The weight percentages are selected based on the reactivities of the part A and part B reactive components such that the reaction between the polyol and isocyanate occurs relatively quickly at room temperature to minimize strike-in between the adjacent wet layers, while not substantially affecting the curing of the bulk polymer resins, which occurs at an elevated temperature. For example, the reaction forming the boundary layer can occur in the range of 68° F. to 75° F. while the bulk curing can occur at a temperature of 80° F. or higher. The time to form the boundary layer can be in the range of 1 to 10 minutes, and depends on the reactivity and cure kinetics of the part A-part B components, and the bulk polymer resins utilized. In certain embodiments, the thickness of the cured interface layer is in the range of 0.1 to 0.5 mils thick.

Other part A-part B reactive component systems are contemplated by the present invention. Non-limiting examples include isocyanate and thiol; epoxy and multifunctional acid; epoxy and thiol; epoxy and amine; epoxy and anhydride; epoxy and polyol; blocked isocyanate and polyol; blocked isocyanate and thiol; acrylate and acetoacetate (Michaels addition reaction); and ketimine and acetoacetate.

Many of the reactive components identified above can be built into an acrylic backbone, such that the main polymer chain is an acrylic, with the reactive functional group being selected from a reactive component identified above. For instance, the main polymer chain in both reactive components of an epoxy and multifunctional acid system can be an acrylic with the functional groups being an epoxy on the A side (for example, an epoxy derived from a glycidyl methacrylate monomer) and a one or more carboxylic acid groups on the B side.

In at least one embodiment, the first and/or second coating compositions can further contain one or more catalysts for controlling the rate of reaction of the part A-part B reaction at the interface between the two adjacent wet layers. In at least one embodiment, the weight percentage of the catalyst is selected such that the reaction rate of the part A-part B reaction at the interface is controlled and/or increased while not substantially affecting the curing rate of the bulk polymer resins. In certain embodiments, the weight percentage of the interface catalyst can be in the range of 0.05 to 2 percent. It should be appreciated that each coating composition can also include a catalyst for controlling and/or increasing the curing reaction of the bulk polymer resin.

In at least one embodiment, a first coating composition can include a bulk polymer resin catalyst for catalyzing the bulk reaction and an interface catalyst for catalyzing the reaction at the interface between the layer and a subsequently applied wet layer. The weight percent of the bulk catalyst can be in the range of 0.05 to 2 weight percent. Non-limiting examples of interface catalysts include strong organic acids or tin-based compounds. Other examples include base catalysts, which can be used with the thiol/epoxy reaction and the Michaels addition reaction, for example.

In at least one embodiment, the first coating composition contains the part A reactive component and the part B reactive component, each at a defined weight percentage relative to the total weight of the first coating composition. For example, the weight percentage of the part A reactive component can be in the range of 10 to 70 weight percentage and the weight percentage of the part B reactive component can be in the range of 10 to 70 weight percentage. The first coating composition also contains a bulk polymer resin at a defined weight percentage relative to the total weight of the first coating composition. For example, the weight percentage of the bulk polymer resin can be in the range of 30 to 90 weight percent. The second coating composition contains a catalyst for catalyzing the reaction between the part A and part B reactive components. The interface catalyst can be selected based on its ability to catalyze the part A-part B reaction so that it proceeds rapidly at the interface between the two layers while not increasing the rate of curing of the bulk polymer resins of the first and second coating compositions. The second coating composition contains a bulk polymer resin at a defined weight percentage relative to the total weight of the second coating composition. For example, the weight percent can be in the range of 30 to 90 weight percent.

The first coating composition can be applied as a previous or subsequently applied layer in a sequential wet on wet application process, while the second coating composition can be the other of the applied layers.

The first and second coating compositions can also include a first and second catalyst, respectively, for controlling and/or increasing the cure rate of the first and second bulk polymer resins, in addition to the interface catalyst for controlling and/or increasing the reaction rate of the part A-part B reaction.

According to one example, the first coating composition is a basecoat that contains a polyol as the part A reactive component at a 10 weight percent and an isocyanate as the part B reactive component at a 10 weight percent. In certain embodiments, the basecoat contains an acrylic compound with hydroxyl functionality mixed with a melamine resin. The second coating composition is a clearcoat that contains a tin-based catalyst at a 0.5 weight percent of the total weight of the second coating composition. In certain embodiments, the clearcoat contains an acrylic compound with hydroxyl functionality mixed with a melamine resin. The part A-part B reaction proceeds relatively quickly at the interface to form the boundary layer. In certain embodiments, the reaction time to form the boundary layer is in the range of 1 to 10 minutes. Moreover, the tin-based catalyst does not substantially affect the rate of curing of the bulk polymer resins in the basecoat and clearcoat. Such curing occurs when the adjacent wet layers are subjected to elevated temperatures, for example, curing in a paint oven.

According to another example, the first coating composition is a basecoat that contains a part A-part B reactive system that is base catalyzed, for example, an isocyanate/thiol system or a Michaels addition reaction system. In certain embodiments, the basecoat contains an acrylic compound with hydroxyl functionality mixed with a melamine resin. The second coating composition is a clearcoat that contains a base catalyst, for example, a tertiary amine, at a 0.5 weight percent of the total weight of the second coating composition. In certain embodiments, the clearcoat contains an isocyanate/polyol based polymer resin. Because of the presence of the base catalyst in the clearcoat, the part A-part B reaction proceeds relatively quickly at the interface to form the boundary layer at room temperature. In certain embodiments, the time to form the boundary layer is in the range of 1 to 10 minutes. Moreover, the base catalyst does not substantially affect the rate of curing of the bulk polymer resins in the basecoat and clearcoat. Such curing occurs when the adjacent wet layers are subjected to a curing process at an elevated temperature.

According to yet another example, the first coating composition is a basecoat that contains a part A-part B component reactive system that is base catalyzed, for example, a thiol/epoxy system, isocyanate/thiol system or a Michaels addition reaction system, and a photolatent base compound, for example, Irgacure 907 from Ciba Specialty Chemicals. In certain embodiments, the basecoat contains an acrylic compound with hydroxyl functionality mixed with a melamine resin. The second coating composition is a clearcoat. In certain embodiments, the clearcoat contains an isocyanate/polyol based polymer resin. After application of the adjacent wet coating layers, a UV light source can be directed at the wet coating layers, thereby at least partially liberating the photolatent base compound in a top portion of the basecoat to quickly cure the top portion, while opacity inhibits the cure in the rest of the basecoat. The thickness of the top portion can be in the range of 1 to 20 percent of the total depth of the basecoat. Moreover, the opacity inhibits the cure in the rest of the basecoat and therefore, the UV light source does not substantially affect the rate of curing of the polymer resins in the basecoat and clearcoat. Such curing occurs when the adjacent wet layers are subjected to a curing process, for example, curing in a paint oven.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A coating system comprising:
   a first layer including
      a first bulk uncured resin having a bulk curing temperature of 80° F. or higher, and
      a polyol in an amount of 10 to 70 percent by weight of the first layer;
   a second layer including
      a second bulk uncured resin having the bulk curing temperature,
      an isocyanate in the second layer, and a catalyst for catalyzing a reaction between the polyol and the isocyanate; and
   a boundary layer having a boundary layer reaction temperature of 68° F. to 75° F. and formed between the first and second layers and being the reaction product of the polyol and isocyanate catalyzed by the catalyst carried out at the boundary layer reaction temperature and having a thickness of 0.1 to 0.5 mils.

2. The coating system of claim 1, wherein the first layer is a basecoat layer and the second layer is a primer coat layer.

3. The coating system of claim 1, wherein the first layer is a clearcoat layer and the second layer is a basecoat layer.

4. The coating system of claim 1, wherein the percent by weight of the catalyst in the second layer is 0.05 to 2 percent by weight.

5. The coating system of claim 1, wherein the first or the second bulk uncured resin is 30 to 90 percent by weight of the first or second layer, respectively.

6. The coating system of claim 1, further comprising a third layer including a third bulk uncured resin and a polyol or an isocyanate, the third layer including the polyol if the second layer is disposed between the first and the third layers, the third layer including the isocyanate if the first layer is disposed between the second and the third layers.

7. The coating system of claim 1, wherein the isocyanate is present in an amount of 10 to 70 percent by weight of the second layer.

8. The coating system of claim 1, wherein the bulk curing temperature is higher than 80° F.

9. The coating system of claim 1, wherein the bulk curing temperature is higher than 212° F.

10. A coating system comprising:
    a first layer including
       a first bulk uncured resin having a bulk curing temperature of 80° F. or higher, and
       a first reactive component including a polyol or a thiol, the first reactive component being present in an amount ranging from 10 to 70 percent by weight of the first layer;
    a second layer including
       a second bulk uncured resin having the bulk curing temperature, and
       a second reactive component reactive with the polyol or thiol;
    a catalyst for the reaction between the first and second reactive components being present in at least one of the first and second layers in an amount ranging from 0.5 to 2 percent; and
    a boundary layer having a boundary layer reaction temperature of 68° F. to 75° F. and formed between the first and second layers and being the reaction product of the first and second reactive components catalyzed by the catalyst carried out at the boundary layer reaction temperature and having a thickness of 0.1 to 0.5 mils.

11. The coating system of claim 10, wherein a formation time of the boundary layer is 1 to 10 minutes.

12. The coating system of claim 10, wherein the catalyst is adapted to not affect the first or second bulk resin curing rates.

13. The coating system of claim 10, wherein the bulk curing temperature is higher than 80° F.

14. The coating system of claim 10, wherein the bulk curing temperature is higher than 212° F.

15. A coating system comprising:
    a first layer including
       a first bulk resin having a bulk curing temperature of 80° F. or higher, and
       a first reactive component including at least one of a thiol composition, a multifunctional acid composition, an amine composition, an anhydride composition, a polyol composition, and an acetoacetate composition, the first reactive component being present in an amount ranging from 10 to 70 percent by weight of the first layer;
    a second layer including
       a second bulk resin having the bulk curing temperature, and
       a second reactive component at least one of an isocyanate composition, an epoxy composition, a blocked isocyanate composition, acrylate compositions, and a ketimine composition;
    a catalyst for the reaction between the first and second reactive components being present in at least one of the first and second layers; and
    a boundary layer having a boundary layer reaction temperature of 68° F. to 75° F. and formed between the first and second layers and being the reaction product of the first reactive and second components catalyzed by the catalyst carried out at the boundary layer reaction temperature and having a thickness of 0.1 to 0.5 mils.

16. The coating system of claim 15, wherein at least one of the first or second bulk resin is present in an amount of 30 to 90 weight percent of the first or second layer, respectively.

17. The coating system of claim 15, wherein the second reactive component is present in an amount of 10 to 70 percent by weight of the second layer.

18. The coating system of claim 15, wherein the catalyst includes a tin-containing composition.

19. The coating system of claim 15, wherein the bulk curing temperature is higher than 80° F.

* * * * *